United States Patent
Law et al.

(10) Patent No.: US 9,728,166 B2
(45) Date of Patent: Aug. 8, 2017

(54) REFRESH RATE MATCHING WITH PREDICTIVE TIME-SHIFT COMPENSATION

(71) Applicant: QUALCOMM Incorporated, San Diego, CA (US)

(72) Inventors: Henry Hing Law, Scarborough (CA); Tung Chuen Kwong, Richmond Hill (CA); Benjamin Koon Pan Chan, Markham (CA); William Lloyd Atkinson, Markham (CA); Wilson Hung Yu, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/831,662

(22) Filed: Aug. 20, 2015

(65) Prior Publication Data
US 2017/0053620 A1   Feb. 23, 2017

(51) Int. Cl.
G09G 5/36      (2006.01)
G06T 1/20      (2006.01)
G09G 5/12      (2006.01)
G09G 5/395     (2006.01)

(52) U.S. Cl.
CPC ........... *G09G 5/363* (2013.01); *G06T 1/20* (2013.01); *G09G 5/12* (2013.01); *G09G 5/395* (2013.01); *G09G 2330/021* (2013.01); *G09G 2340/0435* (2013.01); *G09G 2350/00* (2013.01)

(58) Field of Classification Search
CPC ............... G06T 1/20; G09G 2330/021; G09G 2340/0435; G09G 2350/00; G09G 5/12; G09G 5/363; G09G 5/395
USPC ............. 345/204, 501–502, 522, 547
See application file for complete search history.

(56) References Cited

U.S. PATENT DOCUMENTS

| 6,469,744 | B1 * | 10/2002 | Pearlstein ............... G06F 3/14 348/497 |
| 6,489,933 | B1 * | 12/2002 | Ishibashi ............... G09G 5/363 345/1.1 |
| 7,426,320 | B2 | 9/2008 | Stevens |
| 8,754,904 | B2 | 6/2014 | Bakalash et al. |
| 2007/0057952 | A1 | 3/2007 | Swedberg et al. |
| 2008/0100598 | A1 | 5/2008 | Juenger |
| 2010/0020088 | A1 | 1/2010 | Harumoto |

(Continued)

OTHER PUBLICATIONS

"DXGI Flip model," retrieved on Feb. 2, 2015 from, https://msdn.microsoft.com/en-us/library/windows/desktop/hh706346(v=vs.85).aspx, 6 pp.

(Continued)

*Primary Examiner* — Tony Davis
(74) *Attorney, Agent, or Firm* — Shumaker & Sieffert, P.A.

(57) ABSTRACT

A software application executing on at least one processor may output a video at a frame rate for display at a display device. The at least one processor may synchronize a refresh rate of the display device displaying the video to the frame rate of the video. In response to detecting a potential delay in displaying, at the display device, a frame of the video to be output by the software application, the at least one processor may time-shift at least one of: compositing of the frame and refreshing of the display device to mitigate the potential delay in displaying, at the display device, the frame of the video to be output by the software application.

30 Claims, 12 Drawing Sheets

(56) References Cited

U.S. PATENT DOCUMENTS

| | | | |
|---|---|---|---|
| 2010/0164966 A1* | 7/2010 | Sakariya | G09G 3/20 345/520 |
| 2012/0262463 A1* | 10/2012 | Bakalash | H04N 21/42653 345/501 |
| 2013/0009964 A1 | 1/2013 | Paas | |
| 2013/0201166 A1* | 8/2013 | Wang | G09G 3/18 345/204 |
| 2014/0168229 A1 | 6/2014 | Ungureanu et al. | |
| 2014/0292773 A1* | 10/2014 | Segal | H04N 21/42653 345/502 |
| 2014/0292785 A1* | 10/2014 | Segal | H04N 21/42653 345/522 |
| 2014/0344729 A1 | 11/2014 | Blanco et al. | |
| 2015/0181084 A1* | 6/2015 | Colenbrander | H04N 5/04 348/99 |
| 2015/0264298 A1* | 9/2015 | Colenbrander | H04N 7/013 345/547 |
| 2016/0231863 A1* | 8/2016 | Huang | G06F 3/0418 |

OTHER PUBLICATIONS

"Graphics architecture," retrieved on Feb. 2, 2015 from https://source.android.com/devices/graphics/architecture.html, 18 pp.

"Frame Rating Dissected: Full Details on Capture-based Graphics Performance Testing," retrieved on Feb. 2, 2015 from http://www.pcper.com/reviews/Graphics-Cards/Frame-Rating-Dissected-Full-Details-Capture-based-Graphics-Performance-Tes-11, 12 pp.

"G-SYNC," retrieved on Feb. 2, 2015 from http://www.geforce.com/hardware/technology/g-sync, 1 pp.

"Adaptive VSync," retrieved on Feb. 2, 2015 from http://www.geforce.com/hardware/technology/adaptive-vsync, 1 pp.

"AMD FreeSync™ Technology Frequently Asked Questions," retrieved on Feb. 2, 2015 from http://support.amd.com/en-us/kb-articles/Pages/freesync-faq.aspx, 1 pp.

International Search Report and Written Opinion from International Application No. PCT/US2016/043577, dated Sep. 30, 2016, 17 pp.

Response to the International Written Opinion dated Sep. 30, 2016 in international application No. PCT/US2016/043577, filed Jun. 19, 2017, 5 pp.

* cited by examiner

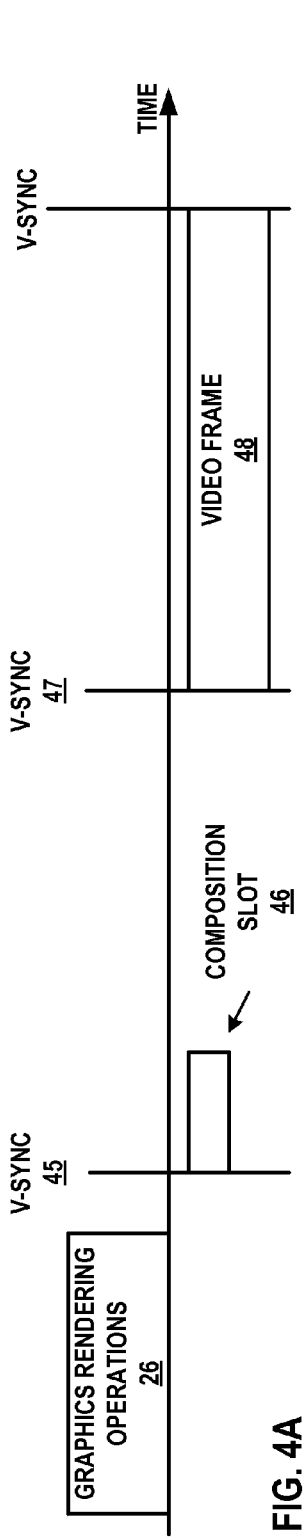
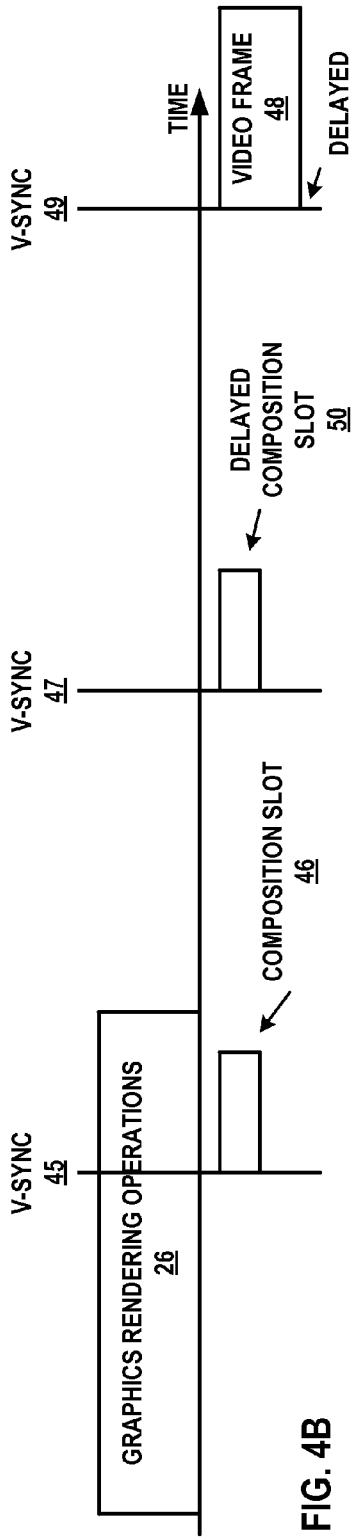
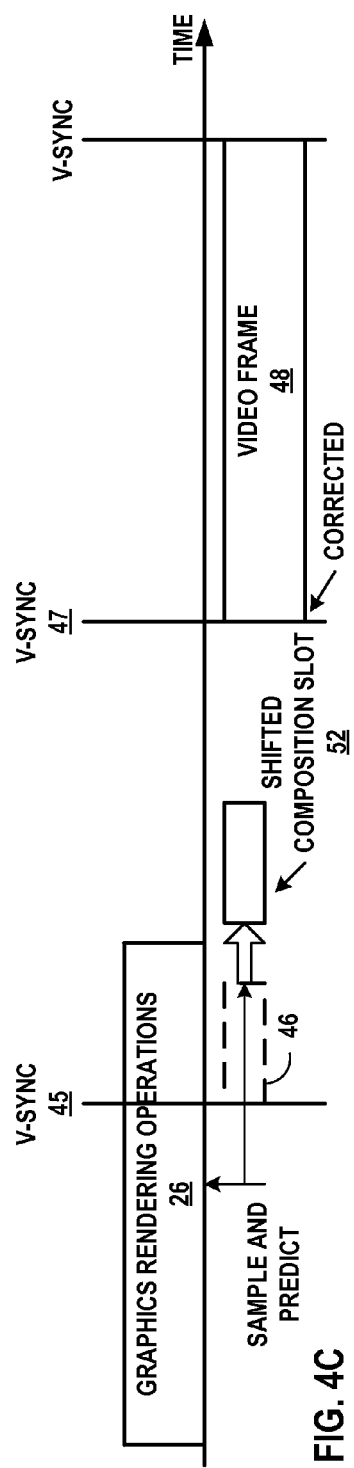
FIG. 4A
FIG. 4B
FIG. 4C

REFRESH RATE MATCHING WITH PREDICTIVE TIME-SHIFT COMPENSATION

TECHNICAL FIELD

The disclosure relates to graphics processing.

BACKGROUND

Videos being displayed by a display device can sometimes exhibit visual artifacts such as stuttering. Stuttering is a visual artifact that occurs when a frame of the video is delayed from being displayed by the display device. When a frame of the video is delayed from being displayed by the display device, the frame of the video immediately preceding to the delayed frame is displayed by the display device for longer than its scheduled duration, and causes the video to appear to stutter.

SUMMARY

In general, aspects of the disclosure are directed to improving the smoothness of graphics frames that are rendered by a computing device and displayed by a display device by minimizing visual artifacts. The computing device may execute a software application that may cause the computing device to output a video at a specified frame rate. Due to a mismatch between the frame rate of the video and the refresh rate of the display device, stuttering may occur as the display device displays the video. The computing device may minimize such stuttering by synchronizing the refresh rate of the display device that is displaying the output video to the frame rate of the video. As the frame rate of the video changes, the computing device may resynchronize the refresh rate of the display device to that of the updated frame rate. The computing device may further minimize stuttering by detecting potential outliers (i.e., situations where stuttering may occur even with the refresh rate matching) and mitigating those potential outliers before they occur.

In one aspect, the disclosure is directed to a method for graphics processing. The method may include outputting, by at least one processor, a video at a frame rate for display at a display device. The method may further include synchronizing, by the at least one processor, a refresh rate of the display device displaying the video to the frame rate of the video. The method may further include in response to detecting a potential delay in displaying a frame of the video, time-shifting, by the at least one processor, at least one of compositing of the frame or refreshing of the display device to mitigate the potential delay in displaying the frame of the video.

In another aspect, the disclosure is directed to a device for graphics processing. The device may include a memory configured to store a video. The device may further include at least one processor configured to: output a video at a frame rate for display at a display device; synchronize a refresh rate of the display device displaying the video to the frame rate of the video; and in response to detecting a potential delay in displaying a frame of the video, time-shift at least one of compositing of the frame or refreshing of the display device to mitigate the potential delay in displaying the frame of the video.

In another aspect, the disclosure is directed to a device for graphics processing. The device may include means for outputting a video at a frame rate for display at a display device. The device may further include means for synchronizing a refresh rate of the display device displaying the video to the frame rate of the video. The device may further include in response to detecting a potential delay in displaying a frame of the video, means for time-shifting at least one of compositing of the frame or refreshing of the display device to mitigate the potential delay in displaying the frame of the video.

In another aspect, the disclosure is directed to a non-transitory computer-readable storage medium comprising instructions for causing a programmable processor to: output, a video at a frame rate for display at a display device; synchronize a refresh rate of the display device displaying the video to the frame rate of the video; and in response to detecting a potential delay in displaying a frame of the video, time-shift at least one of compositing of the frame or refreshing of the display device to mitigate the potential delay in displaying the frame of the video.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A-4C are conceptual diagrams illustrating adaptive time shift compensation for composition in accordance with aspects of the present disclosure.

DETAILED DESCRIPTION

Figure 1:
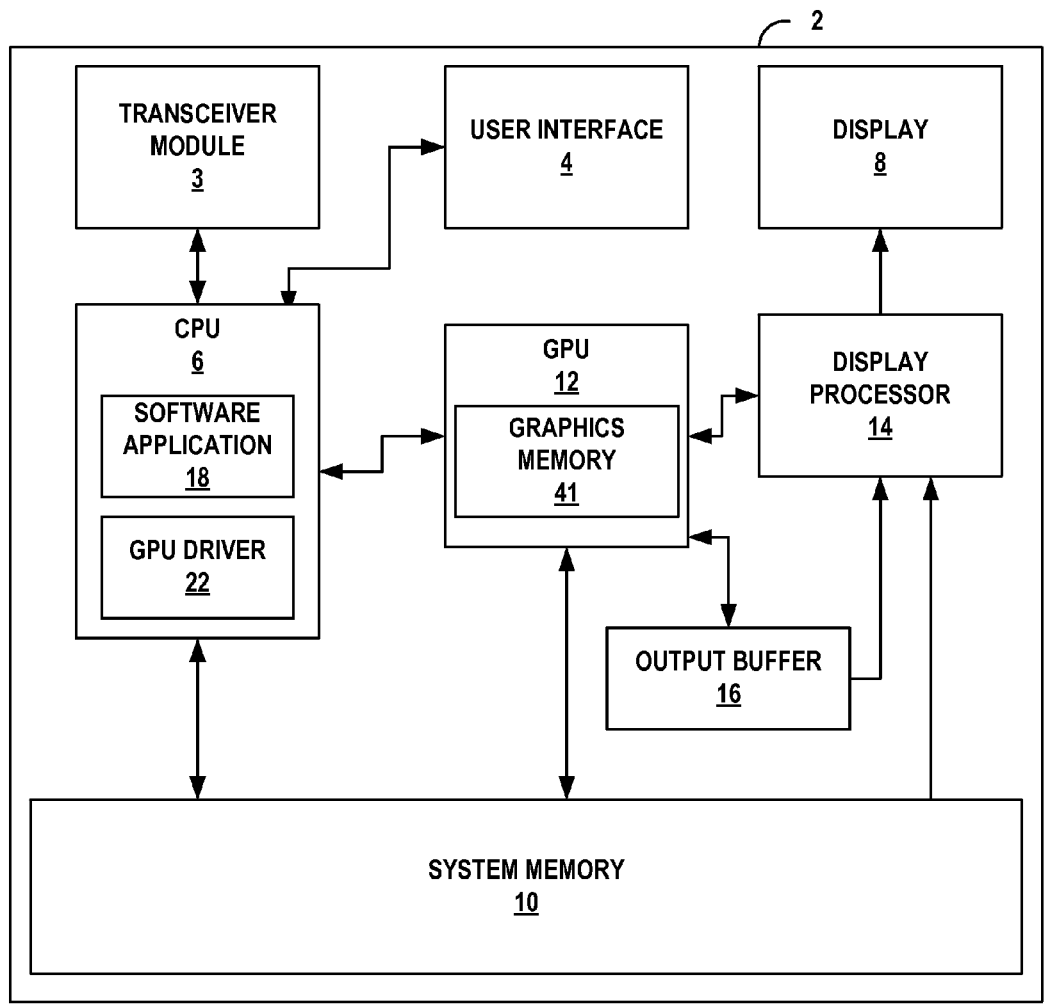
FIG. 1 is a block diagram illustrating an example computing device that may be configured to implement one or more aspects of this disclosure.

In general, aspects of the disclosure are directed to improving the performance of a computing system in displaying a set of graphics frames (e.g., a graphical animation, a video, a video game, and the like). The techniques disclosed herein may include synchronizing a display device's refresh rate to the frame rate of a video being output by a software application executing on a computing device (e.g., video output by a graphics processing unit (GPU)). The techniques disclosed herein may further include detecting potential outliers (i.e., situations where stuttering may occur even with the refresh rate synchronization) and mitigating those potential outliers, thereby providing a low-power solution for improving the performance of a computer device in rendering and displaying graphics frames.

As used throughout the disclosure, vertical synchronization (VSYNC) may refer to the vertical refresh rate of the display device that is synchronized with the buffer swaps that occur during double buffering or triple buffering, where a video frame may be drawn to a back buffer that is then swapped to a front buffer after the drawing of the video frame to the back buffer is complete. By synchronizing the vertical refresh rate of the display to the buffer swaps, the buffer swaps may occur only after the display device has finished its current refresh cycle, thereby preventing screen tearing due to buffer swaps that swap the contents of the next video frame to the output buffer while the display device is reading the output buffer to display the current video frame. Therefore, throughout this disclosure, VSYNC may refer to a refresh of the display device.

In one example, to prevent possible stuttering due to a mismatch between the frame rate of a video being output by a software application and the refresh rate of the display device, a computing device may execute a phase locked loop (PLL) that locks the refresh rate of the display device to the frame rate of the video being output by a GPU or a display processor as a result of graphics rendering operations invoked by the software application. If the frame rate of the video changes, the computing device may use the PLL to re-lock the refresh rate of the display device to the changed frame rate of the video.

In an example where the software application is a video game that includes a game engine that executes to output frames of the video game that is displayed by the display device, the PLL may phase lock the refresh rate of the display device to the start of the game engine frame composition cycle (e.g., as opposed to a buffer swap time), as the start of the game engine cycle may have less variance than the buffer swap time. The buffer swap time is the time when the game engine calls the high-level buffer swap API (e.g., eglSwapBuffer) at the end of the graphical frame submission. The computing device may determine the start of the game engine cycle by, in some examples, detecting the first graphics API commands issued by the game engine for each frame.

However, a software application may not always output frames at a constant frame rate. For example, for some frames, CPU delays, increased scene complexity, and/or other factors may cause frame composition to take longer than normal, and thus may cause the frame rate of the software application to vary. In accordance with the techniques of this disclosure, the computing device may also predict buffer swap times and/or GPU completion times in order to detect instances in which the frame rate of a sequence of frames output by the software application may not match the refresh rate of the display device. The computing device may predict a buffer swap time based at least in part on a draw progress of the software application to predict the end of the graphics API calls of a graphics frame, which may be the time when the game engine may call the high-level buffer swap API. The computing device may also predict a graphics processing unit (GPU) completion time based at least in part on a draw complexity of the software application. Based on the predicted buffer swap times and GPU completion times, the computing device may delay (i.e., time-shift) frame composition and/or a refresh of the display device to mitigate the variance in the frame rate of the sequence of frames output by the software application.

In accordance with aspects of the present disclosure, a software application executing on a computing device may execute on a CPU to issue graphics rendering operations that cause the GPU and/or a display processor of the computing device to output a video at a frame rate for display at a display device that is included in or is otherwise operably coupled to the computing device. The computing device may synchronize a refresh rate of the display device displaying the video to the frame rate of the video. In response to detecting a potential delay in displaying, at the display device, one or more frames of the video, the computing device may time-shift at least one of compositing of the one or more frames or refreshing of the display device to mitigate the potential delay in displaying the one or more frames of the video.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In some examples, computing device 2 may be a mobile communication device. In the example of FIG. 1, computing device 2 may include central processing unit (CPU) 6, system memory 10, and GPU 12. Computing device 2 may also include display processor 14, transceiver module 3, user interface 4, and display device 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Computing device 2 may include additional modules or units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display device 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display device 8. Transceiver module 3 may include circuitry to allow wireless or wired communication between computing device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as software application 18. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

Software application 18 that execute on CPU 6 may include one or more graphics rendering instructions that instruct CPU 6 to cause the rendering of graphics data to display device 8. The instructions may include instructions to process 3D graphics as well as instructions to process 2D graphics. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™) or any other public or proprietary standard GPU compute API. In order to process the graphics rendering instructions of software application 18 executing on CPU 6, CPU 6, during execution of software application 18, may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display device 8. Thus, when software applications 18 executing on CPU 6 requires graphics processing, CPU 6 may provide graphics rendering commands along with graphics data to GPU 12 for rendering to display device 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display device 8 more quickly than drawing the scenes directly to display device 8 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

In some examples, graphics memory 41 may be part of GPU 12. Thus, GPU 12 may read data from and write data to graphics memory 41 without using a bus. In other words, GPU 12 may process data locally using a local storage, instead of off-chip memory. Such graphics memory 41 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 41 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display device 8 to illuminate to display the image. In some examples, display processor 14 may be configured to perform 2D operations on data to be displayed, including scaling, rotation, blending, and compositing. Display device 8 may be the display of computing device 2 that displays the image content generated by GPU 12. Display device 8 may be a liquid crystal display (LCD), an organic light emitting diode display (OLED), a cathode ray tube (CRT) display, a plasma display, or another type of display device.

In accordance with aspects of the present disclosure, software application 18 executing on CPU 6 may cause GPU 12 and/or display processor 14 to output a video at a frame rate for display at display device 8. CPU 6 may synchronize a refresh rate of display device 8 displaying the video to the frame rate of the video. In response to detecting a potential delay in displaying, at display device 8, one or more frames of the video, CPU 6 may time-shift at least one of compositing of the one or more frames or refreshing of display device 8 to mitigate the potential delay in displaying, at display device 8, the one or more frames of the video.

The refresh rate of display device 8 may be the number of times per second that display device 8 updates is displayed. For example, for each refresh of display device 8, display processor 14 may retrieve an image stored in a specified buffer in computing device 2, such as output buffer 16, for display by display device 8. Display device 8 may, in consecutive updates, display the same or different images depending on whether the same image or a different image is stored in output buffer 16 in consecutive updates.

The frame rate of software application 18 is the number of times per second that software application 18 via its issuance of graphics rendering operations causes GPU 12 or display processor 14 to output an updated image which may be displayed by display device 8. For example, if software application 18 is a media player application, an image caused to be output by the video playing application may be a video frame of a video, such that the media player application can output a video by outputting a sequence of video frames of the video. Similarly, if software application 18 is a video game, such as a first person shooter game, a car racing game, and the like, each image caused to be output by the video game may be a frame of a scene being animated by the video game. Throughout this disclosure, the sequence of updated images (i.e. frames) that are caused to be output by software application 18 may be referred to as a video. However, it should be understood that a video may not refer only to the set of video frames output by a video playing application, but may also refer to, in one of many other non-limiting examples, the set of frames of a scene being animated by a video game, and the like.

In some examples, stuttering may occur if software application 18 output a video at a frame rate for display by display device 8 that differs from the refresh rate of display device 8. As such, computing device 2 may alleviate such stuttering by synchronizing the refresh rate of display device 8 with the frame rate of a series of frames output by software application 18.

Figure 2A:
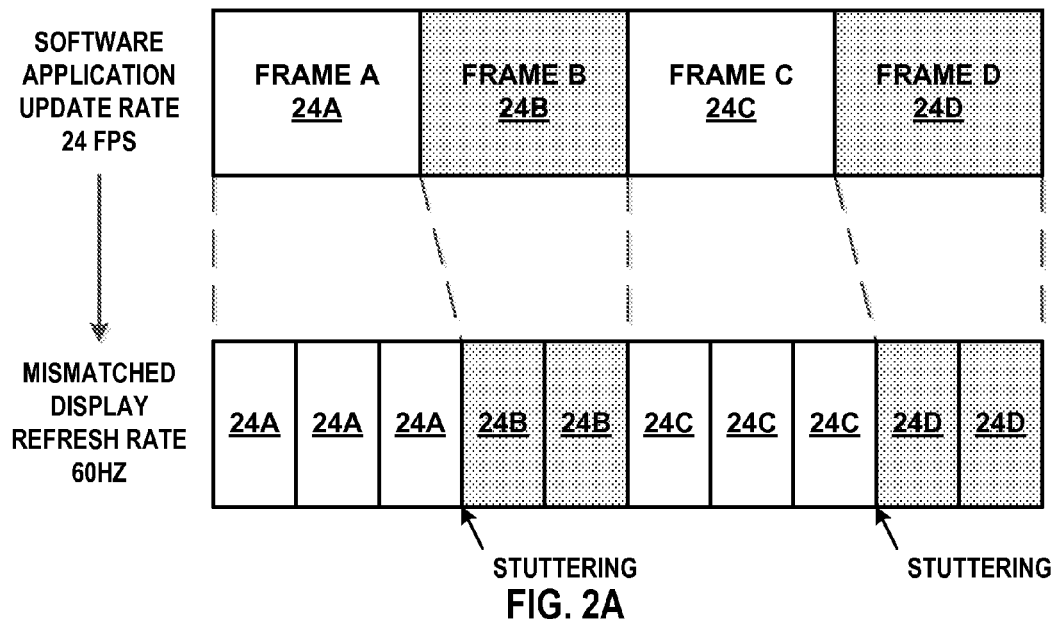
FIGS. 2A and 2B are conceptual diagrams illustrating an example technique for synchronizing the refresh rate of an example display device with the frame rate of a series of frames output by an example software application in accordance with aspects of the present disclosure.
Figure 2B:
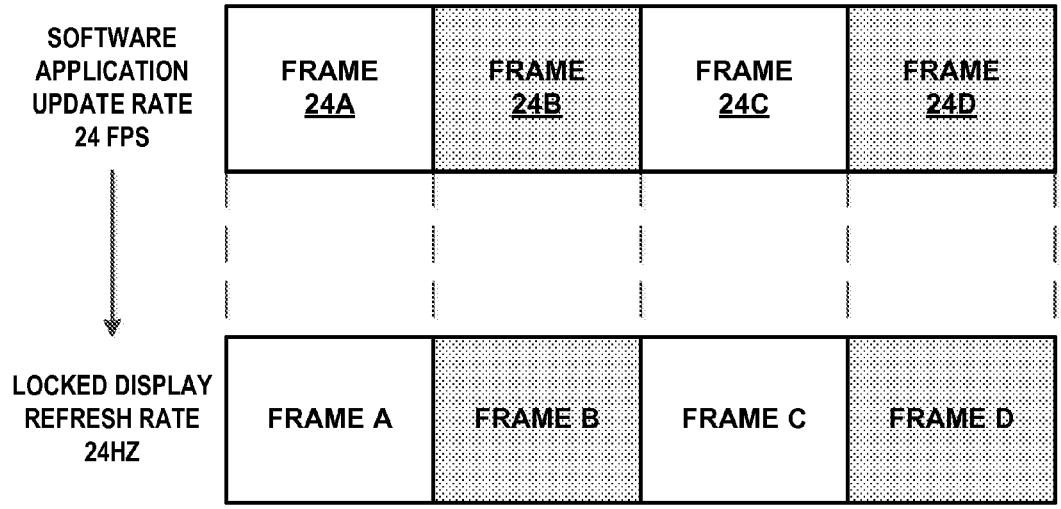

FIGS. 2A and 2B are conceptual diagrams illustrating an example technique for synchronizing the refresh rate of display device 8 with the frame rate of a series of frames output by software application 18 in accordance with aspects of the present disclosure. As shown in the example of FIG. 2A, software application 18 may output video at a frame rate of 24 frames per second (fps) for display at display device 8 that has a refresh rate of 60 Hertz (Hz). Given the ratio of the refresh rate of 60 Hz to the frame rate of 24 FPS, display device 8 may refresh the image it displays five times during the same time span in which software application 18 outputs two frames of a video. As such, display device 8 may not be able to display the two frames of a video for the same number of time.

In the example shown in FIG. 2A, software application 18 that outputs video at 24 fps may consecutively output frames 24A-24B. Display device 8 may display frame 24A for three refresh cycles and may subsequently display frame 24B for two refresh cycles, thereby introducing stuttering between the display of frame 24A and frame 24B. Similarly, display device 8 may display frame 24C for three refresh cycles and may subsequently display frame 24D for two refresh cycles, thereby introducing stuttering between the display of frames 24C and 24D.

In accordance with aspects of the present disclosure, computing device 2 may mitigate stuttering caused by a mismatch between the frame rate of the video and the refresh rate of the display device by synchronizing the refresh rate of the display device displaying the video to the frame rate of the video as output by software application 18. As shown in FIG. 2B computing device 2 may synchronize the refresh rate of display device 8 displaying video being output by software application 18 to the frame rate of the video. For example, if the frame rate of the video is 24 fps, and if the refresh rate of display device 8 prior to synchronization of the refresh rate is 60 Hz, computing device 2 may synchronize the refresh rate of display device 8 to the frame rate of the video by modifying the refresh rate of display device 8 to be the same as (i.e., equal to) the frame rate of the video, so that computing device 2 may adjust the refresh rate of display device 8 from 60 Hz to 24 Hz. In the example illustrated in FIG. 2B, by synchronizing the refresh rate of display device 8 to the frame rate of the video, display device 8 may display each of frames 24A-24B output by software application 18 once, thereby eliminating the stuttering illustrated in FIG. 2A.

In some examples, computing device 2 may synchronize the refresh rate of display device 8 displaying the video to the frame rate of the video by setting the fresh rate of display device 8 to a non-zero positive integer (e.g., 1, 2, 3, and the like) multiple of the frame rate of the video. Thus, if the video has a frame rate of 24 fps, computing device 2 may set the refresh rate of display device 8 to 24 Hz, 48 Hz, 72 Hz, 96 Hz, and the like.

Computing device 2 may synchronize the refresh rate of display device 8 displaying the video to the frame rate of the video using a phase-locked loop. The phase-locked loop, in one example, may be software executed by a processor, such as CPU 6 or GPU 12, that determines the frame rate of the video and accordingly adjusts the frequency in which display processor 14 may retrieve an image stored in a specified buffer in computing device 2, such as output buffer 16. In this way, the refresh rate of display device 8 is set to a specified non-zero integer multiple of the frame rate of the video. In other examples, computing device 2 may utilize a hardware phase-locked loop that is included in or operably coupled to computing device 2.

Computing device 2 may synchronize the refresh rate of display device 8 displaying a video to the frame rate of the video in response to determining the start of a game engine cycle of software application 18 outputting the video. For example, computing device 2 may synchronize the refresh rate of display device 8 to the frame rate of the video in response to software application issuing a clear command, such as a glClear( ) command, and may phase lock the refresh rate of display device 8 to the glClear( ) command of every frame. In other examples, computing device 2 may determine the start of the game engine cycle of software application 18 based on a combination of factors, including whether software application 18 has entered a full screen mode, whether VSYNC is enabled, whether software application 18 is periodically idle, audio output by software application 18, and touch/sensor events received by software application 18.

Computing device 2 may detect that the game engine that is rendering graphical scenery of the video game has been started and may synchronize the refresh rate of display device 8 to the frame rate of the video in response to determining that the game engine has started. In some examples, software application 18 may be a video game that includes a game engine. The game engine is a software framework for periodically updating and rendering graphical frames of the video game according to animations, user interactions, artificial intelligence, physics of objects in a game scene, and the like. The game engine may include an internal timer to draw a new graphical frame for each game engine cycle. As discussed above, computing device 2 may synchronize the refresh rate of display device 8 to the game engine cycle. Because the game engine of software application 18 during execution by computing device 2 may include multiple game engine cycles, and because the frame rate of the video may differ between different game engine cycles, computing device 2 may synchronize the refresh rate of display device 8 to the different frame rates of the video in different game engine cycles. Computing device 2 may synchronize the refresh rate of display device 8 to a first frame rate of the video in a first game engine cycle. Subsequently, computing device 2 may synchronize the refresh rate of display device 8 to a second frame rate of the video in a second game engine cycle.

Computing device 2 may detect that the game engine has been started by, for example, detecting an initial graphics rendering instruction (e.g., an initial graphics API command, an initial OpenGL/EGL API call, DirectX API call, and the like) issued by software application 18. For example, at the start of every game engine cycle, a game engine may issue a graphics rendering instruction to clear the screen, such as an instruction (e.g., glClear( )) to clear output buffer 16. Computing device 2 may, responsive to detecting an initial graphics rendering instruction issued by software application 18, such a graphics rendering instruction to clear the screen, determine that a game engine cycle has started and therefore synchronize the refresh rate of display device 8 displaying the video output by the video game to the frame rate of the video. In this way, computing device 2 may synchronize the refresh rate of display device 8 to the start of the frame composition cycle of the video. In other examples, computing device 2 may detect that the game engine has started by detecting that software application 18 has issued a command to enter a full screen mode.

Besides video stuttering potentially caused by mismatches between the refresh rate of display device 8 and the frame rate of video output by software application 18, video stuttering may also potentially be caused by late frames. Late frames may be frames of video that, due to factors such as processor preemption or scene complexity, are not ready to be displayed by display device 8 at a corresponding refresh cycle of display device 8. If the late frame is not ready to be displayed by display device 8, then display device 8 may instead display the previous video frame for an extra refresh cycle in place of the late frame, thereby causing video stuttering due to not displaying each video frame for the same number of refresh cycles.

Figure 3A:
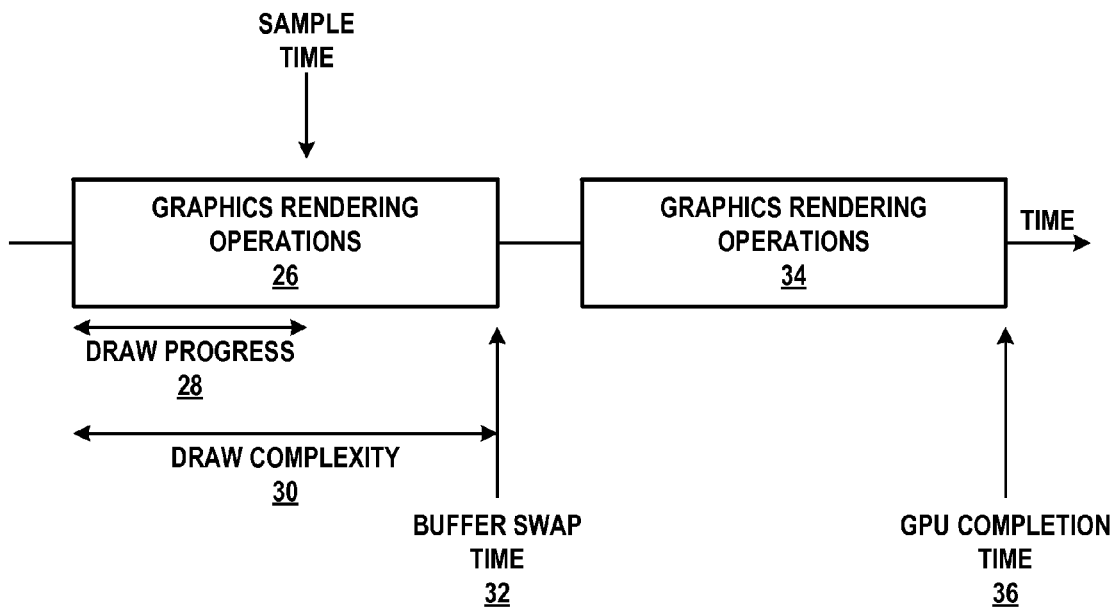
FIGS. 3A and 3B are conceptual diagrams illustrating example techniques for mitigating late frames in accordance with aspects of the present disclosure.
Figure 3B:
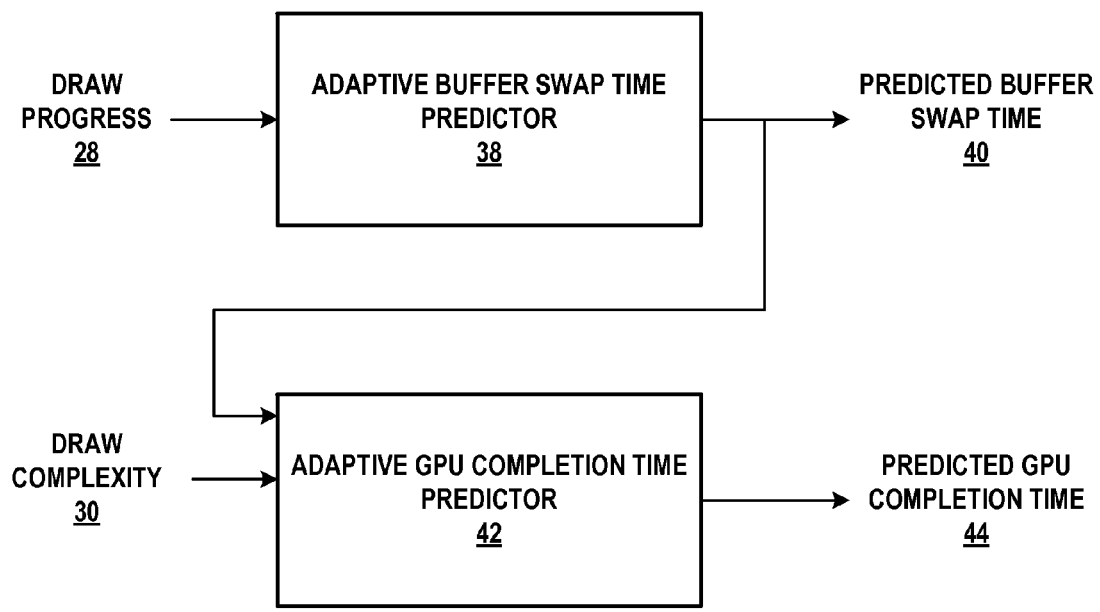

FIGS. 3A and 3B are block diagrams illustrating example techniques for mitigating late frames in accordance with aspects of the present disclosure. As shown in FIG. 3A, software application 18 running on CPU 6 that outputs a video for display by display device 8 may issue a sequence of graphics rendering operations 26 (e.g., graphics API commands) that invokes GPU 12 to perform graphics rendering operations 34 to draw graphics for a video frame of a video.

The GPU completion time 36 may be the time GPU 12 finishes performing graphics rendering operations 34 for the video frame of the video. The buffer swap time 32 may be the time software application 18 finishes issuing the sequence of graphics rendering operations 26 for the video frame. At buffer swap time 32, software application 18 may call the buffer swap API to invoke GPU 12 to start rendering the video frame to a new output buffer (e.g., eglSwapBuffer). If there is not an available output buffer into which for GPU 12 to render the video frame, GPU 12 may wait for an available output buffer into which to render the video frame. In this way, software application 18 may submit a series of graphics rendering operations ended by the buffer swap API and may enqueue an output buffer for composition before rendering completes.

The draw complexity 30 of the video frame may be determined based on a variety of factors, including but not necessarily limited to the number of graphics rendering operations 26 issued by software application 18 to draw graphics for the video frame, the number of primitives that need to be rendered for the particular video frame, the number of textures for the particular video frame, and the like. CPU 6 may sample the sequence of graphics rendering operations 26 as they are issued by software application 18 to determine the draw progress 28 of the video frame, which may be based at least in part on the number of graphics rendering operations issued so far by software application 18 as well as the rate at which software application 18 is issuing those operations.

At a given sample time while software application issues graphics rendering operations 26, CPU 6 may sample the rate at which software application 18 is issuing graphics rendering operations 26 to determine the draw progress 28 and to determine whether software application 18 is delayed in issuing graphics rendering operations 26, such as due to processor preemption or changes in scene complexity of the video frame. For example, if CPU 6 determines that software application has a baseline of issuing one hundred graphics rendering instructions per a given sample period in order to not delay the drawing of the video frame, but determines that, at the given sample time, software application 18 is only issuing sixty graphics rendering instructions per sample period, CPU 6 may determine that there is a high likelihood there will be a delay in drawing the video frame. In some examples, CPU 6 may determine the draw progress 28 (e.g., measure the number of graphics rendering instructions submitted for a video frame) at an offset before the VSYNC for the video frame. CPU 6 may determine such a baseline rate by determining a running average of the number of issued graphics rendering instructions over a specified sample period (e.g., one second) for a specified number of previous video frames in the same sequence of video frames making up the video as the current video frame. CPU 6 may similarly sample previous video frames at the same offset before the VSYNC for those previous video frames. Based on the baseline rate determined by CPU 6 as well as draw complexity 30 of graphics rendering operations 26, CPU 6 may determine buffer swap time 32 at which CPU 6 may perform compositing of the current video frame. Based on the baseline rate determined by CPU 6 as well as draw complexity 30 of graphics rendering operations 26, CPU 6 may also determine GPU completion time 36 at which the video frame may be ready for display by display device 8.

As shown in FIG. 3B, adaptive buffer swap time predictor 38 may execute on CPU 6 to determine predicted buffer swap time 40 based at least in part on draw progress 28, and may adaptively shift the composition slot for the video frame based at least in part on predicted buffer swap time 40, as shown in further detail in FIGS. 4A-4C. Adaptive GPU completion time predictor 42 may also execute on CPU 6 to determine predicted GPU completion time 44 based at least in part on predicted buffer swap time 40 and draw complexity 30, and may adaptively delay a refresh of display device 8 based at least in part on predicted GPU completion time 44, as shown in further detail in FIGS. 5A-5C.

CPU 6 may measure draw complexity 30 based at least in part on a number of primitives submitted by software application 18 at the sample time to predict GPU completion time 36. CPU 6 may determine, based on sampling previous video frames of the video, that software application 18 must have submitted 100 primitives at the sample time (e.g., a specified offset before the VSYNC for the video frame) in order for the video frame to be ready for buffer swap time 32. However, if CPU 6 determines for a video frame that software application 18 has only submitted 50 primitives at the sample time, CPU 6 may estimate predicted GPU completion time 44 from the predicted buffer swap time 40 with only 50 primitives submitted based at least in part on a database of data regarding GPU completion time collected from other similar scenes/videos.

FIGS. 4A-4C are block diagrams illustrating adaptive time shift compensation for composition in accordance with aspects of the present disclosure. As shown in FIG. 4A, for a given video frame 48 that is to be displayed by display device 8, subsequent to software application 18 issuing graphics rendering operations 26 for rendering video frame 48, CPU 6 may perform composition for the video frame in composition slot 46. CPU 6 may synchronize composition slot 46 with the refresh of display device 8 (i.e., VSYNC 45) that occurs immediately after software application 18 has finished issuing graphics rendering operations 26 for rendering the video frame. By synchronizing composition slot 46 with VSYNC 45, CPU 6 can perform composition of video frame 48 so that video frame 48 is ready to be displayed by display device 8 at next refresh (i.e., VSYNC 47) of display device 8.

CPU 6 may execute a composition engine in composition slot 46 to perform display composition of the video frame. For example, the composition engine may be an operating system-level software that periodically combines and/or composites buffers of different windows for display by display device 8. In the example of FIGS. 4A-4C, CPU 6 may compose an output buffer into which GPU 12 has rendered the video frame with one or more other output buffers.

The composition engine may rely on GPU 12 to speed up its operations, and may therefore issue graphics rendering operations 34 to GPU 12. For example, for a full-screen game having only one window, the composition engine may take a game frame buffer from a buffer queue at VSYNC time, copy the contents of the buffer to output buffer 16 using a GPU operation, and then may release the game frame buffer back to the game engine.

As shown in FIG. 4B, due to factors including but not limited to processor preemption and/or changes in scene complexity, software application 18 may not finish issuing graphics rendering operations 26 until after the refresh of display device 8 has occurred at VSYNC 45 has occurred, thereby missing composition slot 46 in which to perform composition for video frame 48. Instead, CPU 6 may delay compositing video frame 48 until delayed composition slot 50 synchronized with the next refresh of display device 8 at VSYNC 47. Due to the delay in compositing video frame 48, video frame 48 is delayed in being ready to be displayed by display device 8. Thus, in the example of FIG. 4B, video frame 48 is not ready to be displayed by display device 8 until the refresh of display device 8 at VSYNC 49, versus being ready to be displayed by display device 8 at the refresh of display device 8 at VSYNC 47 in FIG. 4A.

As shown in FIG. 4C, CPU 6 may potentially prevent the delay in displaying video frame 48 illustrated in FIG. 4B by time-shifting the composition of video frame 48. As discussed above with respect to FIGS. 3A and 3B, CPU 6 may sample software application 18 as it issues graphics rendering operations 26 to determine a draw progress. Adaptive buffer swap time predictor 38 may execute on CPU 6 to determine predicted buffer swap time 40 based at least in part on the draw progress. CPU 6 may determine a composition delay by subtracting the current composition time for composition slot 46 from predicted buffer swap time 40. CPU 6 may shift composition slot 46 by the composition delay such that CPU 6 may perform composition of video frame 48 at shifted composition slot 52 prior to the display device refreshing at VSYNC 47. In this way, CPU 6 can perform composition of video frame 48 prior to VSYNC 47 such that video frame 48 is ready to be displayed by display device 8 at VSYNC 47.

Figure 5A:
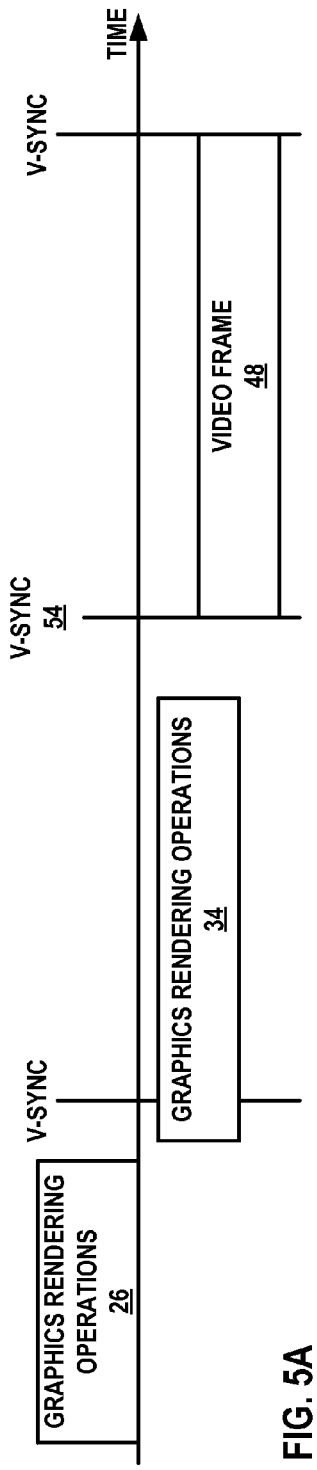
FIGS. 5A-5C are conceptual diagrams illustrating adaptive time shift compensation for display in accordance with aspects of the present disclosure.
Figure 5B:
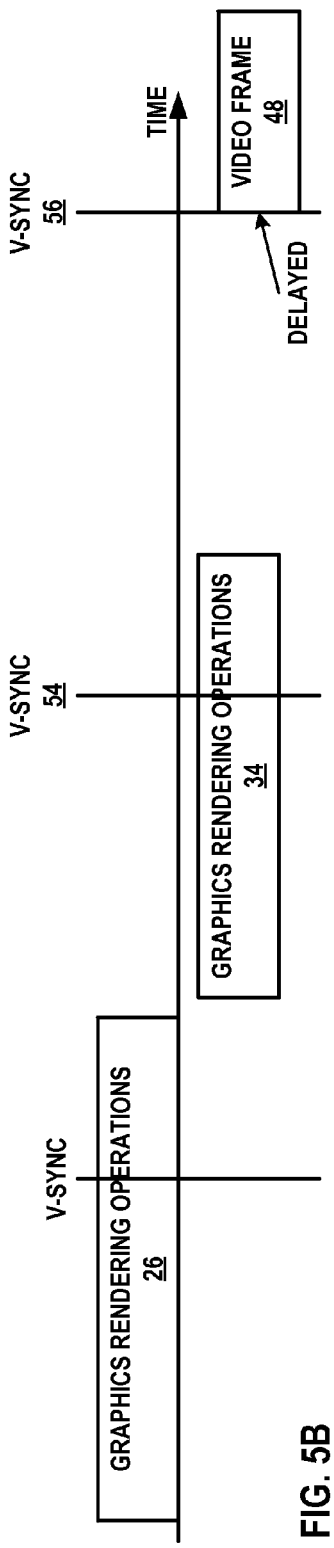
Figure 5C:
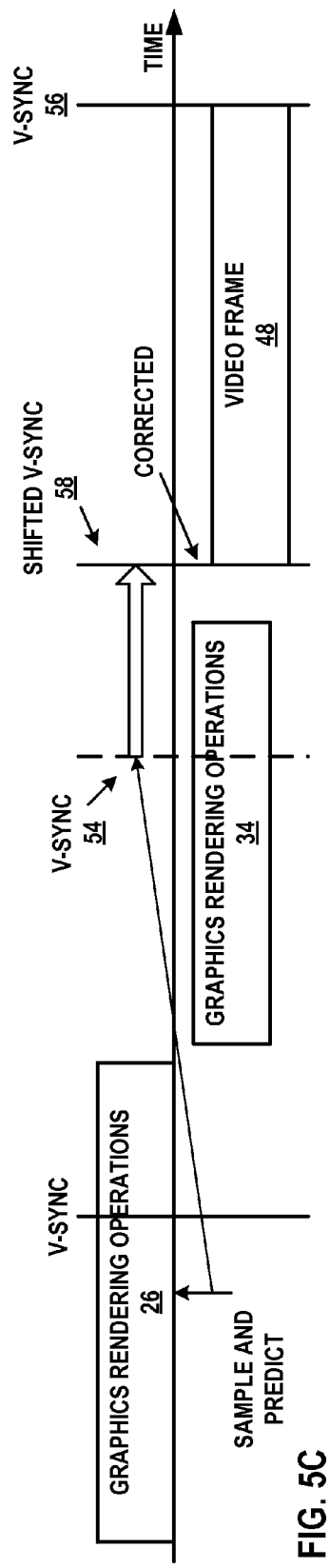

FIGS. 5A-5C are block diagrams illustrating adaptive time shift compensation for display in accordance with aspects of the present disclosure. As shown in FIG. 5A, for a given video frame 48 that is to be displayed by display device 8, software application 18 executing on CPU 6 may issue graphics rendering operations 26 that invokes GPU 12 to perform graphics rendering operations 34 to draw graphics for video frame 48. Responsive to GPU 12 finishes performing graphics rendering operations 34 for video frame 48, display device 8 may display video frame 48 with the refresh of display device 8 at subsequent VSYNC 54.

As shown in FIG. 5B, due to factors including, but not limited to, processor preemption and/or changes in scene complexity, software application 18 may be delayed in issuing graphics rendering operations 26. Consequently, GPU 12 may also be delayed in performing graphics rendering operations 34 to draw graphics for video frame 48. As such, video frame 48 may not be ready for display by display device 8 with the refresh of display device 8 at VSYNC 54. Instead, the display of video frame 48 may be delayed until the subsequent refresh of display device 8 at VSYNC 56.

As shown in FIG. 5C, CPU 6 may potentially prevent the delay in displaying video frame 48 illustrated in FIG. 5B by shifting the refresh of display device 8 that corresponds with the display of video frame 48. As discussed above with respect to FIG. 3B, CPU 6 may sample software application 18 as it issues graphics rendering operations 26 to determine a draw progress 28. Adaptive GPU completion time predictor 42 may execute on CPU 6 to determine predicted GPU completion time 44 based at least in part on the predicted buffer swap time 40 and draw complexity 30. CPU 6 may determine a refresh delay by subtracting the current refresh time for VSYNC 54 from predicted GPU completion time 44. CPU 6 may delay VSYNC 54 by the determined refresh delay such that shifted VSYNC 58 may be scheduled to occur after CPU 6 predicts that GPU 12 will finish performing graphics rendering operations 34 to draw graphics for video frame 48. In this way, shifted VSYNC 58 may correspond with the time at which video frame 48 is predicted by CPU 6 to be ready for display by display device 8, and the display of video frame 48 may be synchronized with shifted VSYNC 58 instead of being delayed to be synchronized with VSYNC 56.

Figure 6:
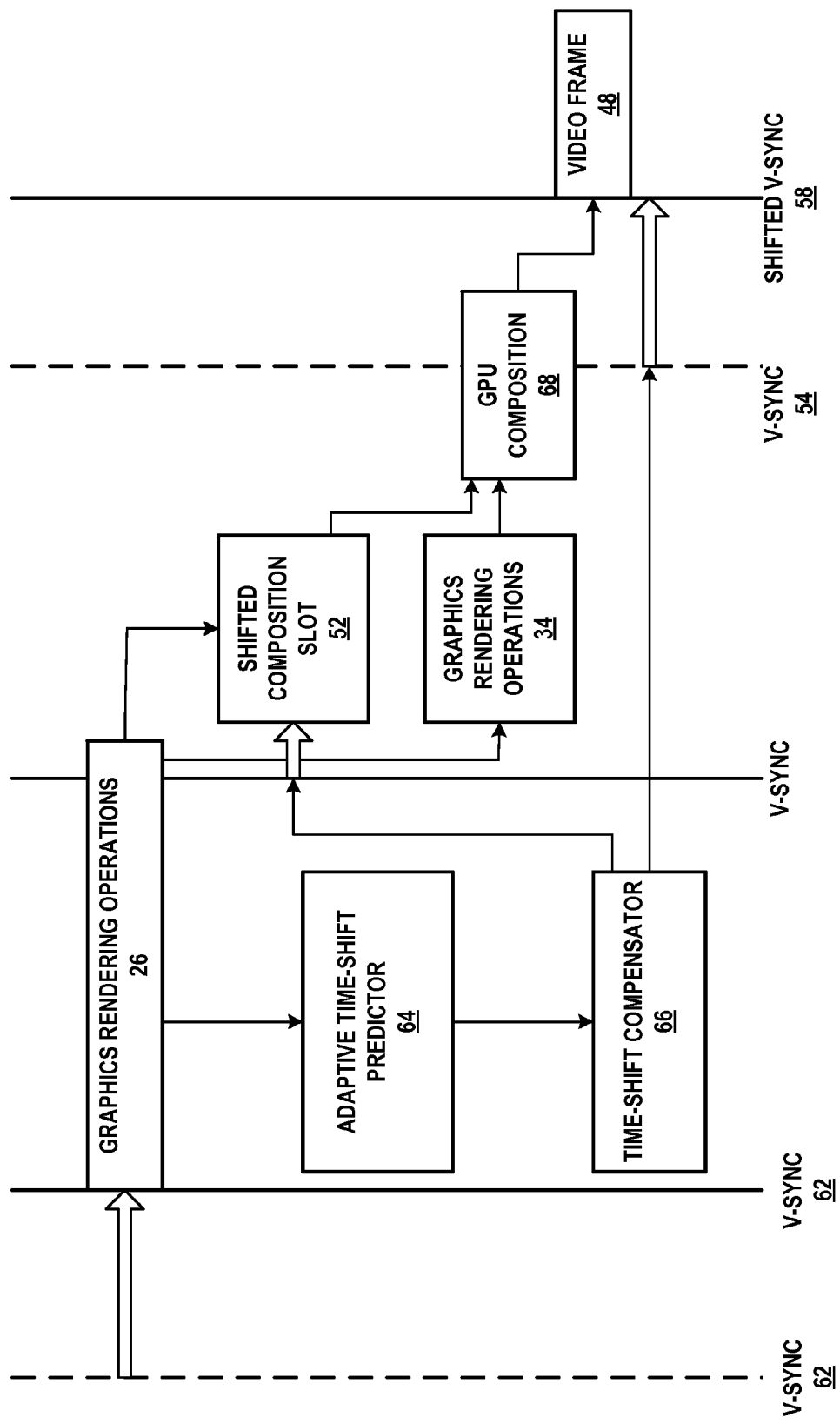
FIG. 6 is a conceptual diagram illustrating an example combination of the example techniques shown in FIGS. 2A-2B, FIGS. 3A-3B, FIGS. 4A-4C, and FIGS. 5A-5C in accordance with aspects of the present disclosure.

FIG. 6 is a block diagram illustrating an example combination of the example techniques shown in FIGS. 2A-2B, FIGS. 3A-3B, FIGS. 4A-4C, and FIGS. 5A-5C in accordance with aspects of the present disclosure. To minimize visual artifacts that may occur during display of video frame 48, CPU 6 may perform one or more of synchronizing the refresh rate of display device 8 to the frame rate of the video being output by software application 18, adaptively time-shifting the CPU composition of video frame 48, and adaptively time-shifting the VSYNC at which video frame 48 is displayed.

As shown in FIG. 6, CPU 6 may synchronize the refresh rate of display device 8 that is displaying a video to the frame rate of the video. CPU 6 may, responsive to detecting start of software application 18's frame composition cycle, lock uncorrected VSYNC 62 to the start of software application 18's frame composition cycle for video frame 48 such that CPU 6 synchronizes the refresh rate of display device 8 to the frame rate of the video being output by software application 18.

Software application 18 may issue a sequence of graphics rendering operations 26 for GPU 12 to graphically render video frame 48. Adaptive time-shift predictor 64 may encompass adaptive buffer swap time predictor 38 and adaptive GPU completion time predictor 42 shown in FIG. 3B. Adaptive time-shift predictor 64 may execute on CPU 6 to sample the draw progress of software application 18 to detect potential delays in displaying, at display device 8, video frame 48 and may output predicted buffer swap time 40 and predicted GPU completion time 44.

Time-shift compensator 66 may execute on CPU 6 to perform one or more of shifting the CPU composition of video frame 48 based at least in part on predicted buffer swap time 40 output by adaptive time-shift predictor 64 and shifting the start of the refresh cycle that corresponds with the display of video frame 48 based at least in part on predicted GPU completion time 44 output by adaptive time-shift predictor 64. Time-shift compensator 66 may shift the CPU composition of graphics frame 48 to shifted composition slot 52 based at least in part on predicted buffer swap time 40. Time-shift compensator 66 may also delay VSYNC 54 by a refresh delay based at least in part on predicted GPU completion time 44 such that shifted VSYNC 58 after GPU 12 has completed processing graphics rendering operations 34 and performing GPU composition 68.

Figure 7:
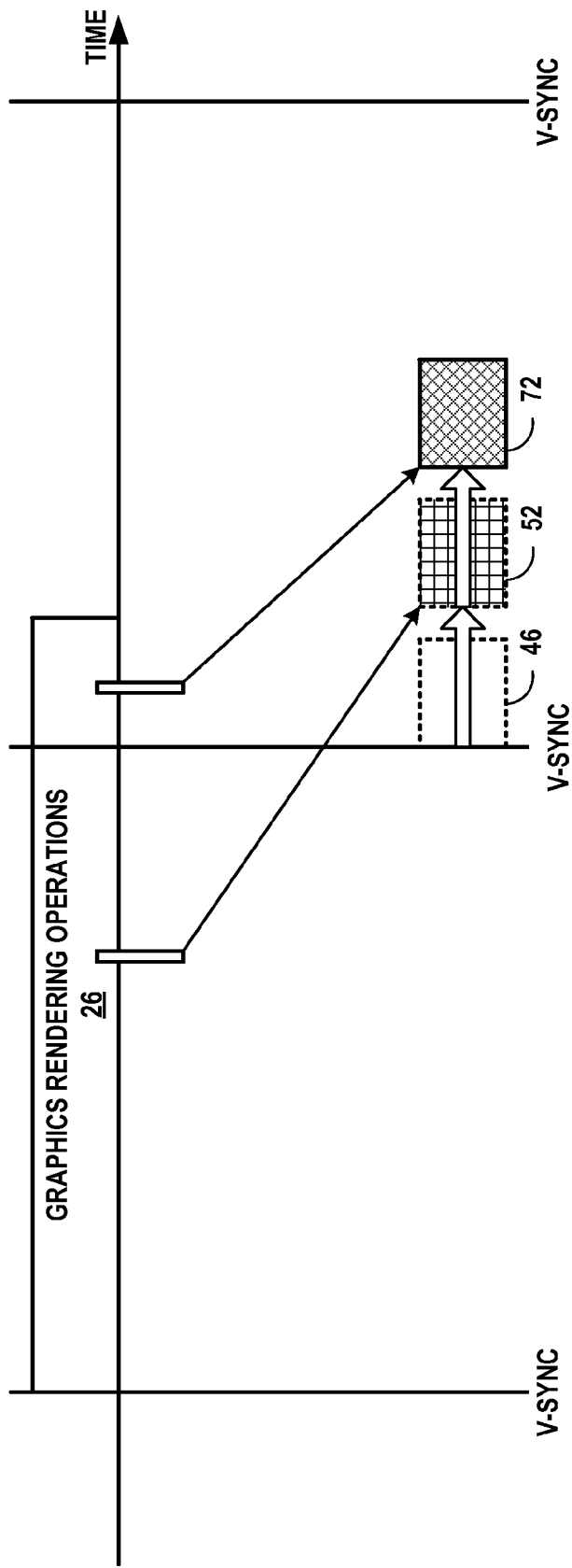
FIG. 7 is a conceptual diagram illustrating an example technique for recovering from mis-predicting adaptive time shift compensation for composition in accordance with aspects of the present disclosure.

In some examples, CPU 6 may mis-predict a buffer swap time for a video frame. As such, CPU 6 may recover from the mis-prediction by re-predicting the buffer swap time. FIG. 7 is a block diagram illustrating an example technique for recovering from mis-predicting adaptive time shift compensation for composition in accordance with aspects of the present disclosure. As discussed above with respect to FIGS. 4A-4C, CPU 6 may, based at least in part on determining predicted buffer swap time 40, delay composition slot 46 by the difference between predicted buffer swap time 40 and the composition time of composition slot 46 to shift composition slot 46 from the composition time to shifted composition slot 52.

However, CPU 6 may also miss shifted composition slot 52 for compositing video frame 48. As such, prior to the time of shifted composition slot 52, but subsequent to the composition time of composition slot 46, CPU 6 may re-sample software application 18's issuing of graphics rendering operations 26 to determine an updated draw progress of software application 18 in issuing graphics rendering operations 26. The updated draw progress may include an indication of the number of graphics rendering operations software application 18 has issued, the rate at which software application 18 is issuing graphics rendering instructions, and the like.

CPU 6 may determine an updated predicted buffer swap time based at least in part on the updated draw progress of video frame 48. For example, CPU 6 may compare the updated draw progress to draw complexity 30 of video frame 48 to predict a time at which software application 18 will finish issuing graphics rendering operations 26. Based on the updated predicted buffer swap time, CPU 6 may further shift shifted composition slot 52 to re-shifted composition slot 72. For example, CPU 6 may shift shifted composition slot 52 based on a difference between the updated predicted buffer swap time and predicted buffer swap time 40.

Figure 8:
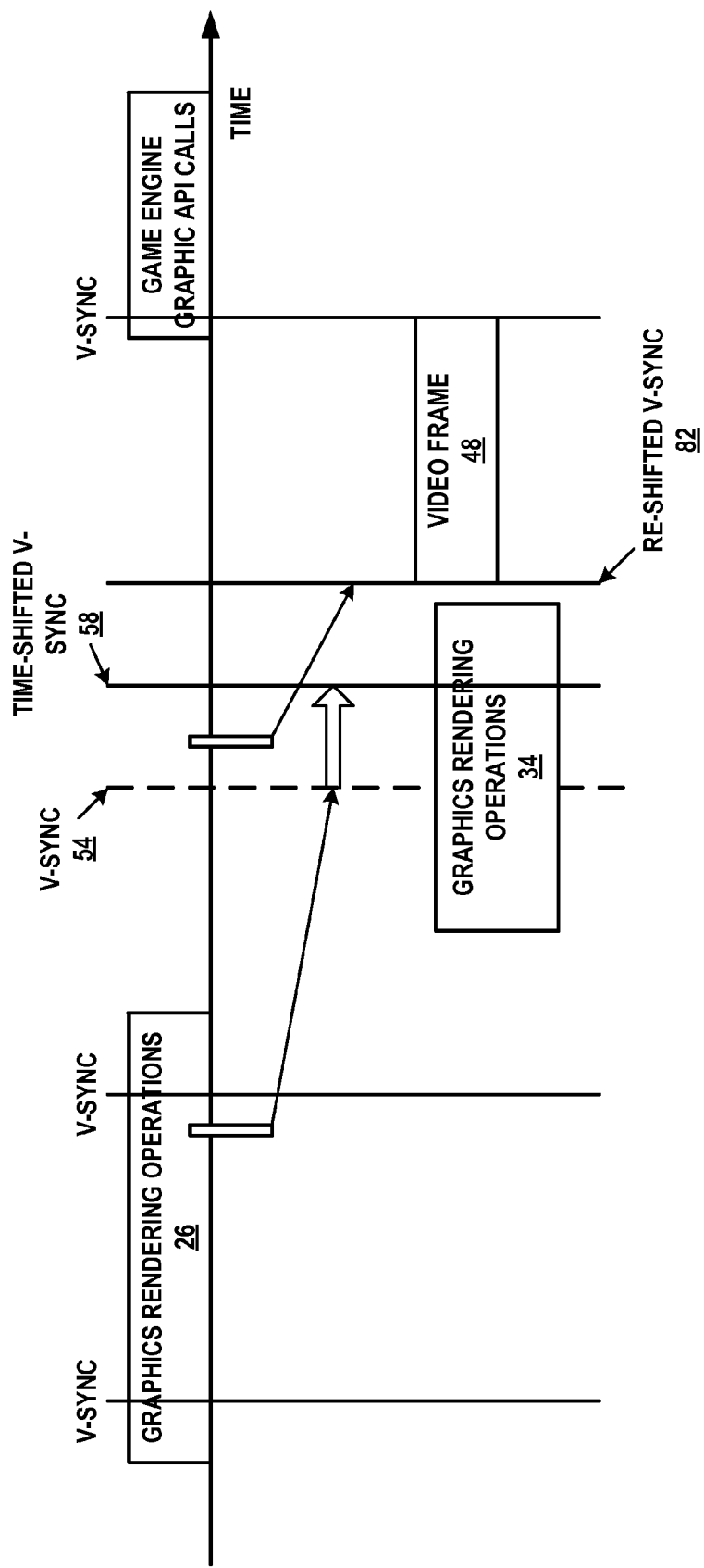
FIG. 8 is a conceptual diagram illustrating an example technique for recovering from mis-predicting adaptive time shift compensation for display in accordance with aspects of the present disclosure.

In some examples, CPU 6 may mis-predict a GPU completion time for a video frame. As such, CPU 6 may recover from the mis-prediction by re-predicting the GPU completion time. FIG. 8 is a block diagram illustrating an example technique for recovering from mis-predicting adaptive time shift compensation for display in accordance with aspects of the present disclosure. As discussed above with respect to FIGS. 5A-5C, CPU 6 may shift the VSYNC that corresponds with the display of video frame 48 based at least in part on determining whether software application 18 is delayed in issuing graphics rendering operations 26 such that video frame 48 may not be ready for display by display device 8 at the time the corresponding VSYNC.

As shown in FIG. 8, CPU 6 may, based on determining predicted GPU completion time 44 for video frame 48, delay VSYNC 54 that corresponds with the display of video frame 48 to result in time-shifted VSYNC 58 if CPU 6 determines, based at least in part on predicted GPU completion time 44, that video frame 48 will not be ready to be displayed by display device 8 at the time of VSYNC 54.

Subsequent to time-shifting VSYNC 54 to result in time-shifted VSYNC 58, and prior to when time-shifted VSYNC 58 takes place, CPU 6 may analyze the available API call sequence of to determine an updated draw progress of video frame 48, and may determine an updated predicted GPU completion time for video frame 48 based at least in part on the updated draw progress of video frame 48 and the actual buffer swap time for video frame 48. When CPU 6 analyzes the available API call sequence, CPU 6 may be able to analyze a more complete API call sequence than CPU 6 was able to initially analyze when the CPU 6 initially mis-predicts the GPU completion time. As such, CPU 6 may be able to determine a more accurate updated draw progress of video frame 48 and to make a more accurate determination of updated predicted GPU completion time for video frame 48.

If CPU 6 determines that the updated predicted GPU completion time for video frame 48 extends past the time in which the refresh of display device 8 at time-shifted VSYNC 58 occurs, CPU 6 may re-shift the time-shifted VSYNC 58 to result in re-shifted VSYNC 82 according to a difference between the updated predicted GPU completion time and the time in which the refresh of display device 8 at time-shifted VSYNC 58 occurs. Subsequent to displaying video frame 48 in accordance with re-shifted VSYNC 82, CPU 6 may re-synchronize the refresh rate of display device 8 to the frame rate of the video output by software application 18 by locking the subsequent VSYNC to the start of the frame composition cycle for the subsequent frame of the video.

Figure 9:
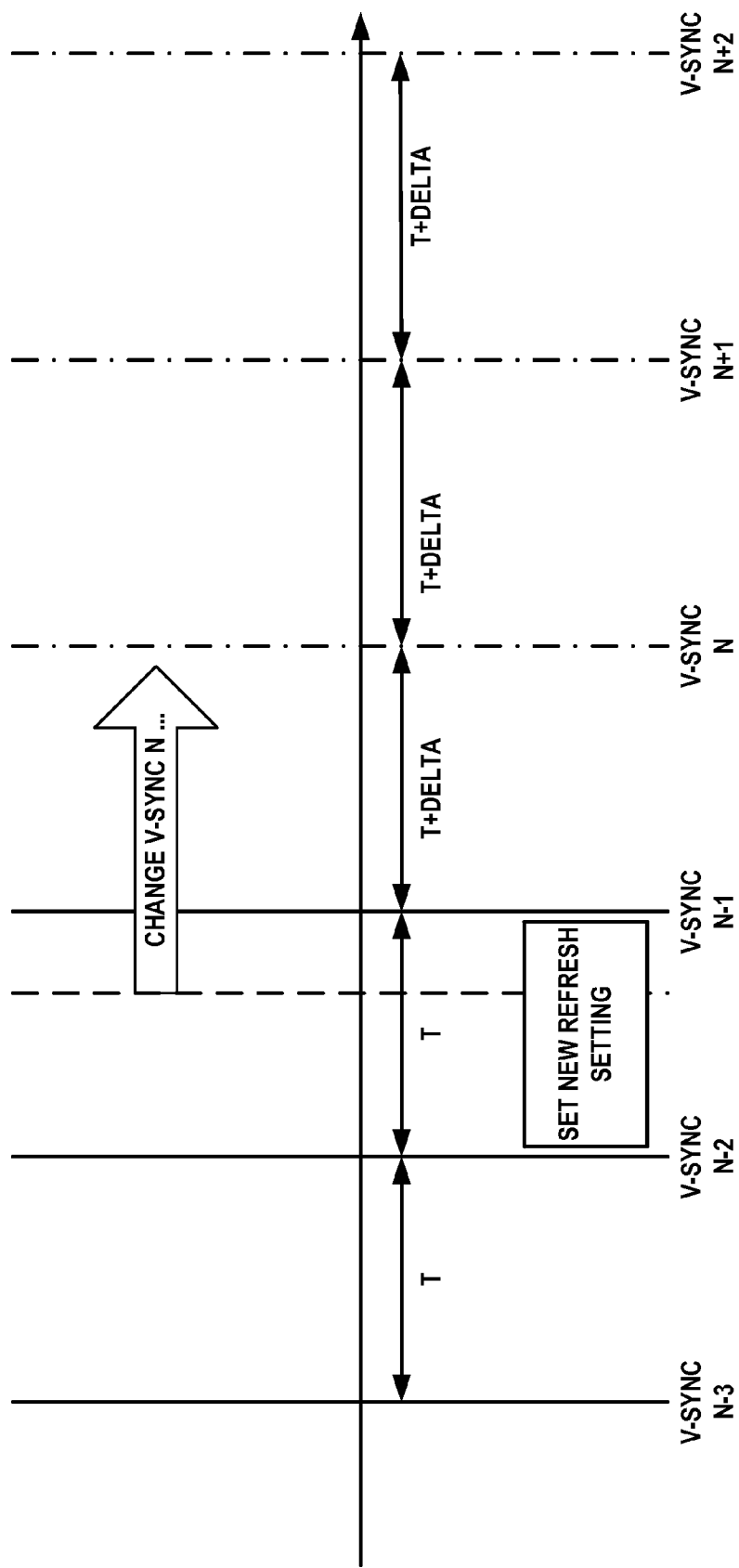
FIG. 9 is a conceptual diagram illustrating an example change in refresh rate of an example display device in accordance with aspects of the present disclosure.

As discussed throughout this disclosure, CPU 6 may be able to adaptively time shift the refresh rate of display device 8 in order to synchronize the refresh rate with the frame rate of a video or to delay the refresh rate to accommodate a delayed video frame. FIG. 9 is a block diagram illustrating an example change in refresh rate of display device 8 in accordance with aspects of the present disclosure. As shown in FIG. 9, CPU 6 may change the refresh rate of display device 8 at VSYNC n from T to T+delta by setting the new refresh rate before VSYNC n−1.

Figure 10:
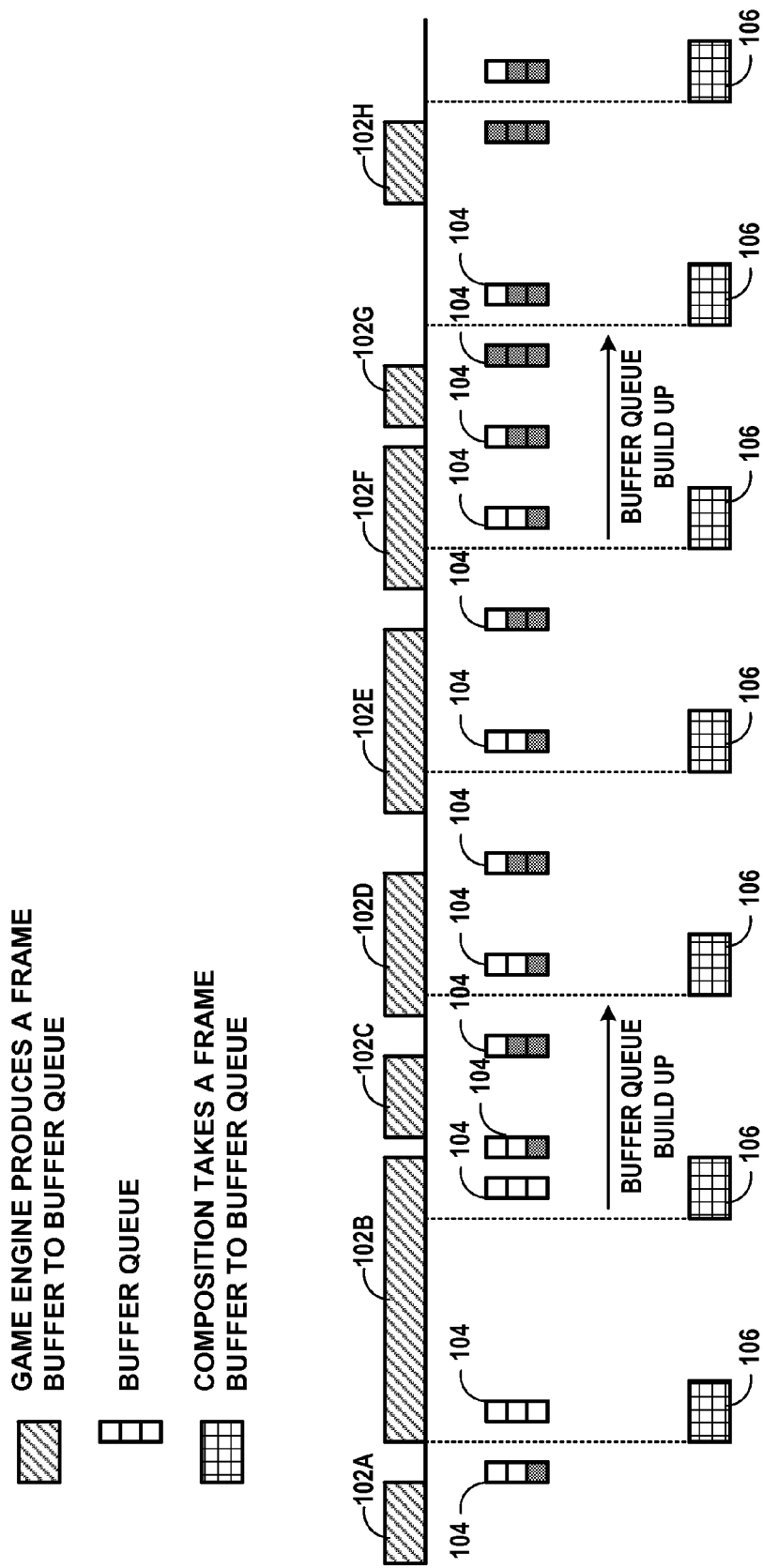
FIG. 10 is a conceptual diagram illustrating buffer queue buildup in accordance with aspects of the present disclosure

FIG. 10 is a block diagram illustrating buffer queue buildup in accordance with aspects of the present disclosure. Outliers as described throughout this disclosure may cause such buffer buildups, which may cause stuttering. As shown in FIG. 10, software application 18 may execute on CPU 6 to invoke sets of graphics rendering operations 120A-102H. Each set of the sets of graphics rendering operations 102A-H may be a set of graphics rendering operations for rending a video frame of a video. Once a set of graphics rendering operations in the sets of graphics rendering operations 102A-102H produces a video frame, CPU 6 may queue the produced video frame in buffer queue 104. CPU 6 may compose a video frame by consuming a frame from buffer queue 104. CPU 6 may have one composition slot 106 per refresh cycle of display device 8 for composing a graphics frame. However, because software application 18 may produce video frames faster than CPU 6 can compose video frames, frames produced by the sets of graphics rendering operations 102A-102H may build up in buffer queue 104. When buffer queue 104 is full, buffer queue 104 cannot accept any additional video frames produced by software application 18 until CPU 6 consumes a frame from buffer queue 104 for composition at one of the composition slot 106, thereby leading to possible stuttering as additional video frames produced by software application 18 are delayed from being enqueued into buffer queue 104.

Figure 11:
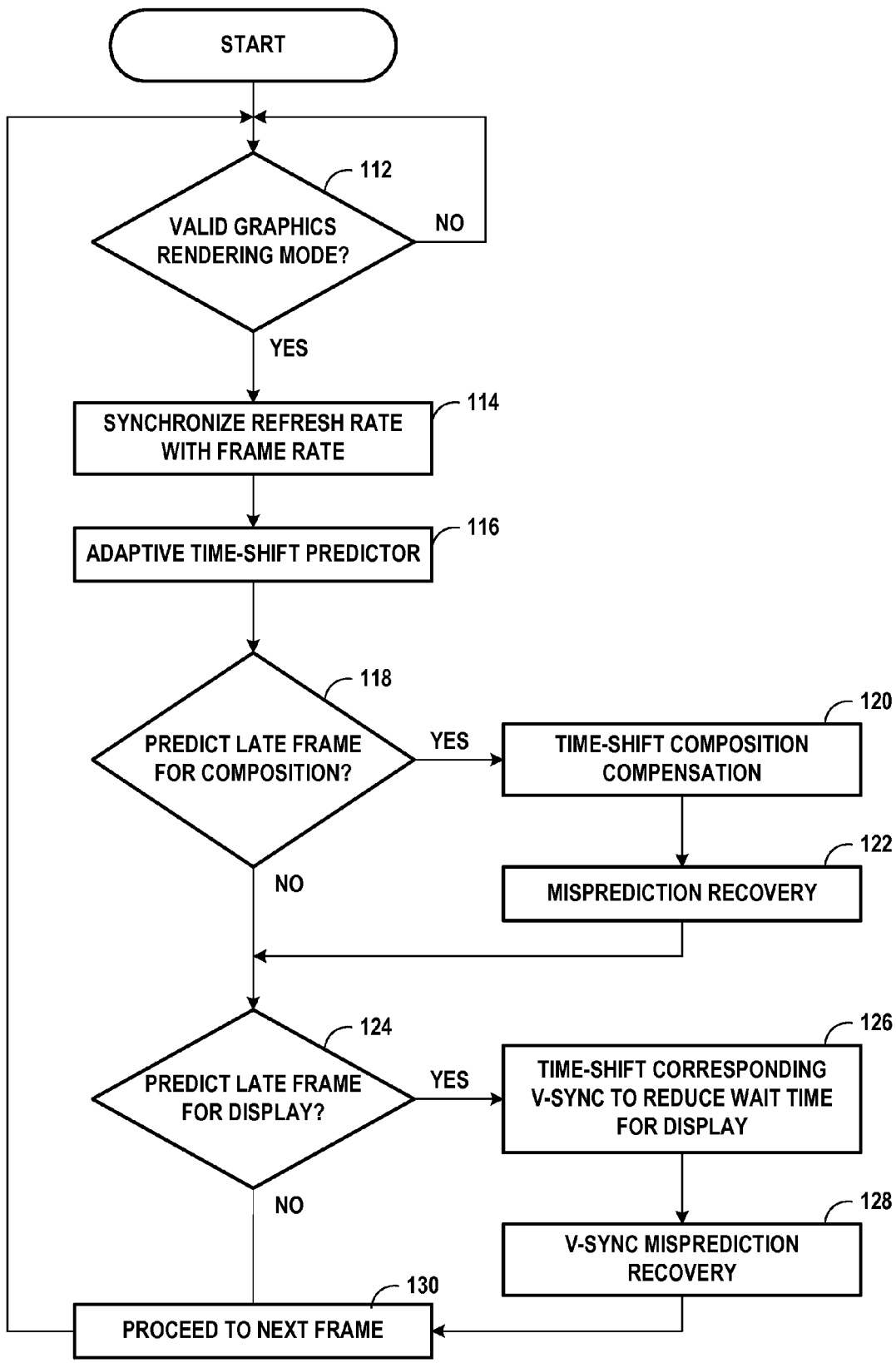
FIG. 11 is a flowchart illustrating an example technique for minimizing visual artifacts in accordance with aspects of the present disclosure.

FIG. 11 is a flowchart illustrating an example technique for minimizing visual artifacts in accordance with aspects of the present disclosure. As shown in FIG. 11, software application 18 that executes on CPU 6 may enter a graphics rendering mode (e.g., a game mode for a video game application) where CPU 6 outputs a video. CPU 6 may determine whether software application 18 is in a valid graphics rendering mode to output video for display at display device 8 (112), such as by determining whether software application 18 is in a full screen mode, determining that software application 18 does not require any hardware composition even though there is a composition engine phase, determining that there is a periodic idle in invoking graphics operations, determining that VSYNC is enabled to prevent screen tearing, determining that software application 18 is outputting audio, and/or determining that software application 18 is receiving touch and/or sensor events. Responsive to determining that software application 18 is in a valid graphics rendering mode and therefore is invoking graphics rendering commands, CPU 6 may synchronize the refresh rate of display device 8 displaying the video to the frame rate of the video as output by software application 18 (114).

CPU 6 may invoke adaptive time-shift predictor 64 to sample the draw progress of software application 18 to detect potential delays in displaying, at display device 8, video frame 48 (116). If adaptive time-shift predictor 64 predicts a composition delay for video frame 48 (118), time-shift compensator 66 may execute on CPU 6 to perform shifting of the CPU composition of video frame 48 based at least in part on predicted buffer swap time 40 output by adaptive time-shift predictor 64 (120). If time-shift compensator 66 mis-predicts the compensation delay for video frame 48, adaptive time-shift predictor 64 may predict an updated buffer swap time, and time-shift compensator 66 may re-shift the CPU composition of video frame 48 based at least in part on the updated buffer swap time (122).

If adaptive time-shift predictor 64 predicts a late frame for display of video frame 48 (124), time-shift compensator 66 may execute on CPU 6 to perform shifting of the corresponding VSYNC to reduce the wait time for display of video frame 48 based at least in part on predicted GPU completion time 44 output by adaptive time-shift predictor 64 (126). If time-shift compensator 66 mis-predicts the display delay for video frame 48, adaptive time-shift predictor 64 may predict an updated predicted GPU completion time, and time-shift compensator 66 may re-shift the corresponding VSYNC for the display of video frame 48 based at least in part on the updated predicted GPU completion time (128). After outputting graphics frame 48 for display by display device 8, CPU 6 may proceed to process the next frame in the video (130).

Figure 12:
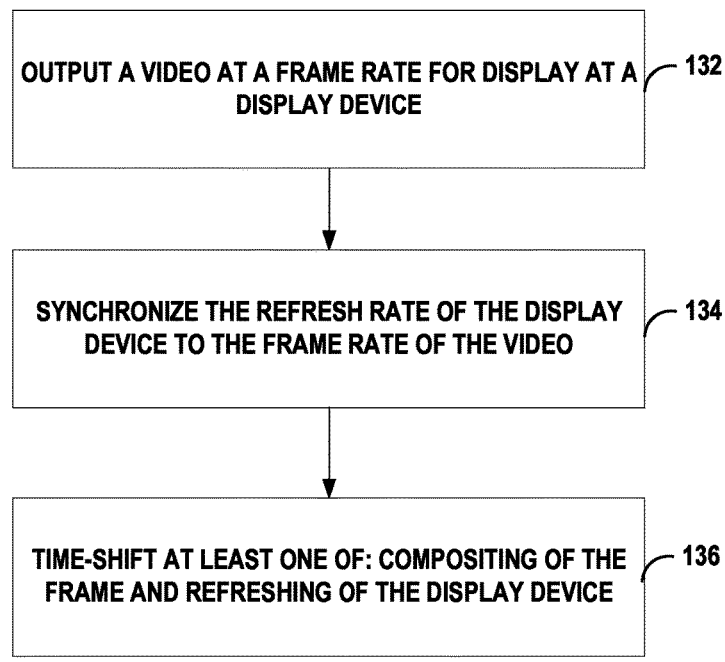
FIG. 12 is a flow chart illustrating an example operation of computing device 2 in further detail.

FIG. 12 is a flow chart illustrating an example operation of computing device 2 in further detail. As shown in FIG. 12, GPU 12 and/or display processor 14 may output a video at a frame rate for display at display device 8 (132). CPU 6 may synchronize a refresh rate of display device 8 displaying the video to the frame rate of the video (134). In response to detecting a potential delay in displaying, at display device 8, video frame 48 of the video, CPU 6 may time-shift at least one of compositing of video frame 48 or refreshing of display device 8 to mitigate the potential delay in displaying, at display device 8, video frame 48 of the video (136).

In some examples, synchronizing, by CPU 6, the refresh rate of display device 8 displaying the video to the frame rate of the video further comprises setting, by CPU 6, the refresh rate of display device 8 displaying the video to a positive integer multiple of the frame rate of the video. In some examples, detecting, by CPU 6, the potential delay in displaying, at display device 8, video frame 48 of the video further comprises determining, by CPU 6, a predicted buffer swap time based at least in part on a draw progress of video frame 48 of the video.

In some examples, time-shifting, by CPU 6, at least one of compositing of video frame 48 or refreshing of display device 8 to mitigate the potential delay in displaying, at display device 8, video frame 48 of the video further comprises time-shifting, CPU 6, composition of video frame 48 based on the predicted buffer swap time. In some examples, detecting, by CPU 6, the potential delay in displaying, at display device 8, video frame 48 of the video further comprises determining, by CPU 6, a predicted GPU completion time based at least in part on the predicted buffer swap time. In some examples, time-shifting, by the CPU 6, at least one of compositing of video frame 48 or refreshing of display device 8 to mitigate the potential delay in displaying, at display device 8, video frame 48 of the video further comprises time-shifting, by CPU 6, a refresh of display device 8 based at least in part on the predicted GPU completion time.

In some examples, the process may further include determining, by CPU 6, an updated predicted buffer swap time based at least in part on an updated draw progress of video frame 48 and perform a second time-shift, by CPU 6, of the composition of video frame 48 based at least in part on the updated predicted buffer swap time. In some examples, the process may further include determining, by CPU 6, an updated predicted GPU completion time based at least in part on analyzing an available sequence of graphics operations and performing a second time-shift, by CPU 6, of the refresh of display device 8 based at least in part on the updated predicted GPU completion time.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for graphics processing comprising:
    outputting, by at least one processor, a video at a frame rate for display at a display device;
    synchronizing, by the at least one processor, a refresh rate of the display device displaying the video to the frame rate of the video;
    detecting, by the at least one processor and based at least in part on a draw progress of a frame of the video, that the frame of the video will potentially not be ready for display at a refreshing of the display device; and
    in response to the detecting, time-shifting, by the at least one processor, at least one of compositing of the frame or the refreshing of the display device to mitigate a potential delay in displaying the frame of the video resulting from the frame of the video not being ready for display at the refreshing of the display device.

2. The method of claim 1, wherein synchronizing, by the at least one processor, the refresh rate of the display device displaying the video to the frame rate of the video further comprises:
    setting, by the at least one processor, the refresh rate of the display device displaying the video to a positive integer multiple of the frame rate of the video.

3. The method of claim 1, wherein detecting, by the at least one processor and based at least in part on the draw progress of the frame of the video, that the frame of the video will potentially not be ready for display at the refreshing of the display device further comprises:
    determining, by the at least one processor, a predicted buffer swap time based at least in part on the draw progress of the frame of the video.

4. The method of claim 3, wherein time-shifting, by the at least one processor, at least one of compositing of the frame or the refreshing of the display device to mitigate the potential delay in displaying the frame of the video further comprises:
    time-shifting, by the at least one processor, composition of the frame based on the predicted buffer swap time.

5. The method of claim 4, further comprising:
    determining, by the at least one processor, an updated predicted buffer swap time based at least in part on an updated draw progress of the frame; and
    performing a second time-shifting, by the at least one processor, of the composition of the frame based at least in part on the updated predicted buffer swap time.

6. The method of claim 3, wherein detecting, by the at least one processor and based at least in part on the draw progress of the frame of the video, that the frame of the video will potentially not be ready for display at the refreshing of the display device further comprises:
    determining, by the at least one processor, a predicted graphics processing unit (GPU) completion time based at least in part on the predicted buffer swap time.

7. The method of claim 6, wherein time-shifting, by the at least one processor, at least one of compositing of the frame or the refreshing of the display device to mitigate the potential delay in displaying the frame of the video further comprises:
    time-shifting, by the at least one processor, a refresh of the display device based at least in part on the predicted GPU completion time.

8. The method of claim 7, further comprising:
    determining, by the at least one processor, an updated predicted GPU completion time based at least in part on analyzing an available sequence of graphics operations; and
    performing a second time-shifting, by the at least one processor, of the refresh of the display device based at least in part on the updated predicted GPU completion time.

9. A device for graphics processing comprising:
    a memory configured to store application video for output;
    at least one processor configured to:
        output the video at a frame rate for display at a display device;
        synchronize a refresh rate of the display device displaying the video to the frame rate of the video;
        detect, based at least in part on a draw progress of a frame of the video, that the frame of the video will potentially not be ready for display at a refreshing of the display device; and
        in response to the detecting, time-shift at least one of compositing of the frame or the refreshing of the display device to mitigate a potential delay in displaying the frame of the video resulting from the frame of the video not being ready for display at the refreshing of the display device.

10. The device of claim 9, wherein the at least one processor is further configured to:
    set the refresh rate of the display device displaying the video to a positive integer multiple of the frame rate of the video.

11. The device of claim 9, wherein the at least one processor is further configured to:
    determine a predicted buffer swap time based at least in part on the draw progress of the frame of the video.

12. The device of claim 11, wherein the at least one processor is further configured to:
    time-shift composition of the frame based at least in part on the predicted buffer swap time.

13. The device of claim 12, wherein the at least one processor is further configured to:
    determine an updated predicted buffer swap time based at least in part on an updated draw progress of the frame; and
    perform a second time-shift of the composition of the frame based at least in part on the updated predicted buffer swap time.

14. The device of claim 11, wherein the at least one processor is further configured to:

determine a predicted graphics processing unit (GPU) completion time based at least in part on the predicted buffer swap time.

15. The device of claim 14, wherein the at least one processor is further configured to:
time-shift a refresh of the display device based at least in part on the predicted GPU completion time.

16. The device of claim 15, wherein the at least one processor is further configured to:
determine an updated predicted GPU completion time based at least in part on analyzing an available sequence of graphics operations; and
perform a second time-shift of the refresh of the display device based at least in part on the updated predicted GPU completion time.

17. The device of claim 9, wherein the at least one processor comprises a central processing unit.

18. The device of claim 9, wherein the device is a mobile communication device that comprises the display device.

19. The device of claim 9, wherein the at least one processor comprises a central processing unit, a graphics processing unit, and a display processor.

20. A device for graphics processing comprising:
means for outputting a video at a frame rate for display at a display device;
means for synchronizing a refresh rate of the display device displaying the video to the frame rate of the video;
means for detecting, based at least in part on a draw progress of a frame of the video, that the frame of the video will potentially not be ready for display at a refreshing of the display device; and
in response to the detecting, means for time-shifting at least one of compositing of the frame or the refreshing of the display device to mitigate a potential delay in displaying the frame of the video resulting from the frame of the video not being ready for display at the refreshing of the display device.

21. The device of claim 20, further comprising:
means for determining a predicted buffer swap time based at least in part on the draw progress of the frame of the video.

22. The device of claim 21, wherein the means for time-shifting at least one of compositing of the frame or the refreshing of the display device to mitigate the potential delay in displaying the frame of the video further comprises:
means for time-shifting composition of the frame based on the predicted buffer swap time.

23. The device of claim 22, further comprising:
means for determining an updated predicted buffer swap time based at least in part on an updated draw progress of the frame; and
means for performing a second time-shift of the composition of the frame based at least in part on the updated predicted buffer swap time.

24. The device of claim 21, further comprising:
means for determining a predicted graphics processing unit (GPU) completion time based at least in part on the predicted buffer swap time.

25. The device of claim 24, wherein the means for time-shifting at least one of compositing of the frame or the refreshing of the display device to mitigate the potential delay in displaying the frame of the video further comprises:
means for time-shifting a refresh of the display device based at least in part on the predicted GPU completion time.

26. The device of claim 25, further comprising:
means for determining an updated predicted GPU completion time based at least in part on analyzing an available sequence of graphics operations; and
means for performing a second time-shift of the refresh of the display device based at least in part on the updated predicted GPU completion time.

27. A non-transitory computer-readable storage medium comprising instructions for causing a programmable processor to:
output a video at a frame rate for display at a display device;
synchronize a refresh rate of the display device displaying the video to the frame rate of the video;
detect, based at least in part on a draw progress of a frame of the video, that the frame of the video will potentially not be ready for display at a refreshing of the display device; and
in response to the detecting, time-shift at least one of compositing of the frame or refreshing of the display device to mitigate a potential delay in displaying the frame of the video resulting from the frame of the video not being ready for display at the refreshing of the display device.

28. The non-transitory computer-readable storage medium of claim 27, further comprising:
determine a predicted buffer swap time based at least in part on a draw progress of the frame of the video; and
time-shift composition of the frame based on the predicted buffer swap time.

29. The non-transitory computer-readable storage medium of claim 27, further comprising:
determine a predicted graphics processing unit (GPU) completion time based at least in part on the predicted buffer swap time; and
time-shift a refresh of the display device based at least in part on the predicted GPU completion time.

30. The non-transitory computer-readable storage medium of claim 29, further comprising:
determine an updated predicted buffer swap time based at least in part on an updated draw progress of the frame; and
perform a second time-shift of the composition of the frame based at least in part on the updated predicted buffer swap time.

* * * * *